United States Patent
Endicott et al.

(10) Patent No.: US 7,168,243 B2
(45) Date of Patent: Jan. 30, 2007

(54) NOX ADSORBER AND METHOD OF REGENERATING SAME

(75) Inventors: Dennis L. Endicott, Peoria, IL (US); Maarten Verkiel, Metamora, IL (US); James J. Driscoll, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 8 days.

(21) Appl. No.: 11/074,402

(22) Filed: Mar. 7, 2005

(65) Prior Publication Data
US 2006/0196175 A1 Sep. 7, 2006

(51) Int. Cl.
*F01N 3/00* (2006.01)

(52) U.S. Cl. .......................... 60/295; 60/274; 60/276; 60/297; 60/301

(58) Field of Classification Search ................. 60/274, 60/276, 277, 285, 295, 297, 301
See application file for complete search history.

(56) References Cited

U.S. PATENT DOCUMENTS

| | | | |
|---|---|---|---|
| 5,948,964 A | | 9/1999 | Kato |
| 5,992,142 A | * | 11/1999 | Pott .......................... 60/274 |
| 6,010,615 A | | 1/2000 | Kato et al. |
| 6,071,393 A | | 6/2000 | Oshima et al. |
| 6,167,695 B1 | * | 1/2001 | Itou et al. ..................... 60/274 |
| 6,199,374 B1 | * | 3/2001 | Hirota et al. .................. 60/277 |
| 6,263,667 B1 | * | 7/2001 | Sawada et al. ............... 60/277 |
| 6,453,663 B1 | | 9/2002 | Orzel et al. |
| 6,487,851 B1 | * | 12/2002 | Okada et al. .................. 60/285 |
| 6,691,020 B2 | * | 2/2004 | Meyer et al. ............... 701/108 |
| 2003/0056500 A1 | | 3/2003 | Huynh et al. |
| 2004/0031261 A1 | | 2/2004 | Sun et al. |

OTHER PUBLICATIONS

Dipl.-Ing.T.Colliou, Dr.J.Lavy, Dr.B.Martin, Dr.J.B.Dementhon, IFP, Lyon; Dipl.-Ing G.Pichon, Dipl.-Ing K. Chandes, Dipl.-Ing. L. Pierron, Renault Trucks., ST Priest; Coupling of a NOx-trap and a DPF for Emission Reduction of a 6-Cylinder HD Engine; pp. 1-19. May; APBF-DEC Heavy Duty NOx Adsorber/DPF Project: Heavy Duty Linehaul Platform Project Update; APBF-DEC Yearly Program Review Rosemont, Chicago, Oct. 7-8, 2003; pp. 1-70; Technical Specialist, Performance and Emissions Chicago Technical Center, Ricardo Inc.; Chicago, Illinois.

(Continued)

*Primary Examiner*—Binh Q. Tran
(74) *Attorney, Agent, or Firm*—Liell & McNeil

(57) ABSTRACT

New technologies, such as NOx adsorber catalytic converters, are being used to meet increasingly stringent regulations on undesirable emissions, including NOx emissions. NOx adsorbers must be periodically regenerated, which requires an increased fuel consumption. The present disclosure includes a method of regenerating a NOx adsorber within a NOx adsorber catalytic converter. At least one sensor positioned downstream from the NOx adsorber senses, in the downstream exhaust, at least one of NOx, nitrous oxide and ammonia concentrations a plurality of times during a regeneration phase. The sensor is in communication with an electronic control module that includes a regeneration monitoring algorithm operable to end the regeneration phase when a time rate of change of the at least one of NOx, nitrous oxide and ammonia concentrations is after an expected plateau region begins.

20 Claims, 4 Drawing Sheets

OTHER PUBLICATIONS

M. Van Genderen, M. Van Aken; NOx Storage Phase 6-9 Catalyst and Control Algorithm Validation NOx-BSFC trade offs ESC De-Sulphirisation; Aug. 15, 2002; pp. 1-71; Caterpillar, Inc; Peoria, Illinois.

U.S. Department of Energy, Engine Manufacturers Association, Manufacturers of Emission Controls Association; Diesel Emission Control Sulfur Effects (DECSE) Program; Oct. 2000; pp. 1-43; Phase II Summary Report: NOx Adsorber Catalysts.

* cited by examiner

NOX ADSORBER AND METHOD OF REGENERATING SAME

TECHNICAL FIELD

The present disclosure relates generally to NOx adsorbers, and more specifically to a method of regenerating a NOx adsorber.

BACKGROUND

In order to meet increasingly stringent federal regulations of NOx and other undesirable emissions, engineers are constantly seeking new strategies of reducing the undesirable emissions. One method of reducing NOx emissions is an urea treatment for exhaust. Although the urea treatment reduces the NOx in the exhaust to a harmless gas, ammonia ($NH_3$) emissions can be created by the reduction, thus potentially requiring an after treatment. Further, the infrastructure to support urea treatment technology, such as urea tanks at gas stations, is not yet available in the United States.

Another method of reducing NOx, without the need for the after treatment and the extensive support infrastructure, is the NOx adsorber catalytic converter, otherwise known as the NOx trap. The NOx trap operates in two alternative phases: a storage phase and a regeneration phase. During the storage phase, the normal operation of an engine produces a reductant-lean exhaust in which the NOx is oxidized and stored on a catalyst, referred to as a NOx adsorber. The storage phase can last anywhere from thirty seconds to ten minutes. During the regeneration phase, the engine produces a reductant-rich exhaust, in which the NOx is de-stored and converted into harmless gasses. The regeneration phase generally lasts one to fifteen seconds. In order to create the reductant-rich environment for the regeneration of the NOx adsorber, additional fuel is required. Because the NOx traps often use fixed lean/rich cycle times to alternate between the two phases, the regeneration phase may last longer than necessary, resulting in a fuel penalty. Moreover, if the regeneration phase continues beyond the de-storage of the NOx adsorber, reductant and ammonia emissions can occur.

In order to lessen the fuel penalty without prematurely stopping the regeneration, a method of determining when the regeneration of the NOx adsorber is completed was suggested in an article, Coupling of a NOx-trap and a DPF for Emission Reduction of a 6-Cylinder HD Engine, published by Renault and presented at the International Motor Symposium, Vienna, Austria, May 15-16, 2003. The Renault Trucks article suggests using an oxygen sensor downstream from the NOx trap to determine the time required to regenerate the NOx adsorber. The oxygen sensor measures an equivalence ratio of the exhaust downstream from the NOx adsorber. The equivalence ratio—the inverse of lambda—is defined as stoichiometric air-to-fuel ratio divided by actual air-to-fuel ratio. When the equivalence ratio of the downstream exhaust exceeds one, the NOx adsorber is regenerated.

Because the oxygen sensor method can determine the end of regeneration based on the reactions occurring during each NOx, adsorber cycle, the use of the oxygen sensor may be a more accurate method to determine the end of regeneration than the one size fits all timed fuel/lean cycles. However, there is still room for improvement. It is always a goal to further minimize the amount of undesirable emissions, such as NOx, CO and ammonia emissions ($NH_3$) in the exhaust.

The present disclosure is directed at overcoming one or more of the problems set forth above.

SUMMARY OF THE DISCLOSURE

In one aspect of the present disclosure, a method of regenerating a NOx adsorber includes a step of regenerating the NOx adsorber. During the regeneration, at least one of NOx, nitrous oxide and ammonia concentrations is sensed in the downstream exhaust a plurality of times. It is determined whether a time rate of change of the at least one of NOx, nitrous oxide and ammonia concentrations is after an expected plateau region begins. If the time rate of change of the at least one of NOx, nitrous oxide, and ammonia concentrations is after the expected plateau region begins, the regeneration of the NOx adsorber is ended.

In another aspect of the present disclosure, an engine includes a NOx adsorber positioned within an exhaust passage. At least one sensor is positioned downstream from the NOx adsorber, and is operable to sense, in the downstream exhaust, at least one of NOx, nitrous oxide and ammonia concentrations a plurality of times during a regeneration phase of the NOx adsorber. The at least one sensor is in communication with an electronic control module that includes a regeneration monitoring algorithm that is operable to end the regeneration phase when a time rate of change of the at least one of NOx, nitrous oxide and ammonia concentrations is after an expected plateau region begins.

In yet another aspect of the present disclosure, an article includes a computer readable data storage medium on which means are recorded to determine when a NOx adsorber is regenerated to a predetermined extent, at least in part, by determining, during regeneration, if a time rate of change of at least one of NOx, nitrous oxide and ammonia concentrations is after an expected plateau region begins.

DETAILED DESCRIPTION

Figure 1:
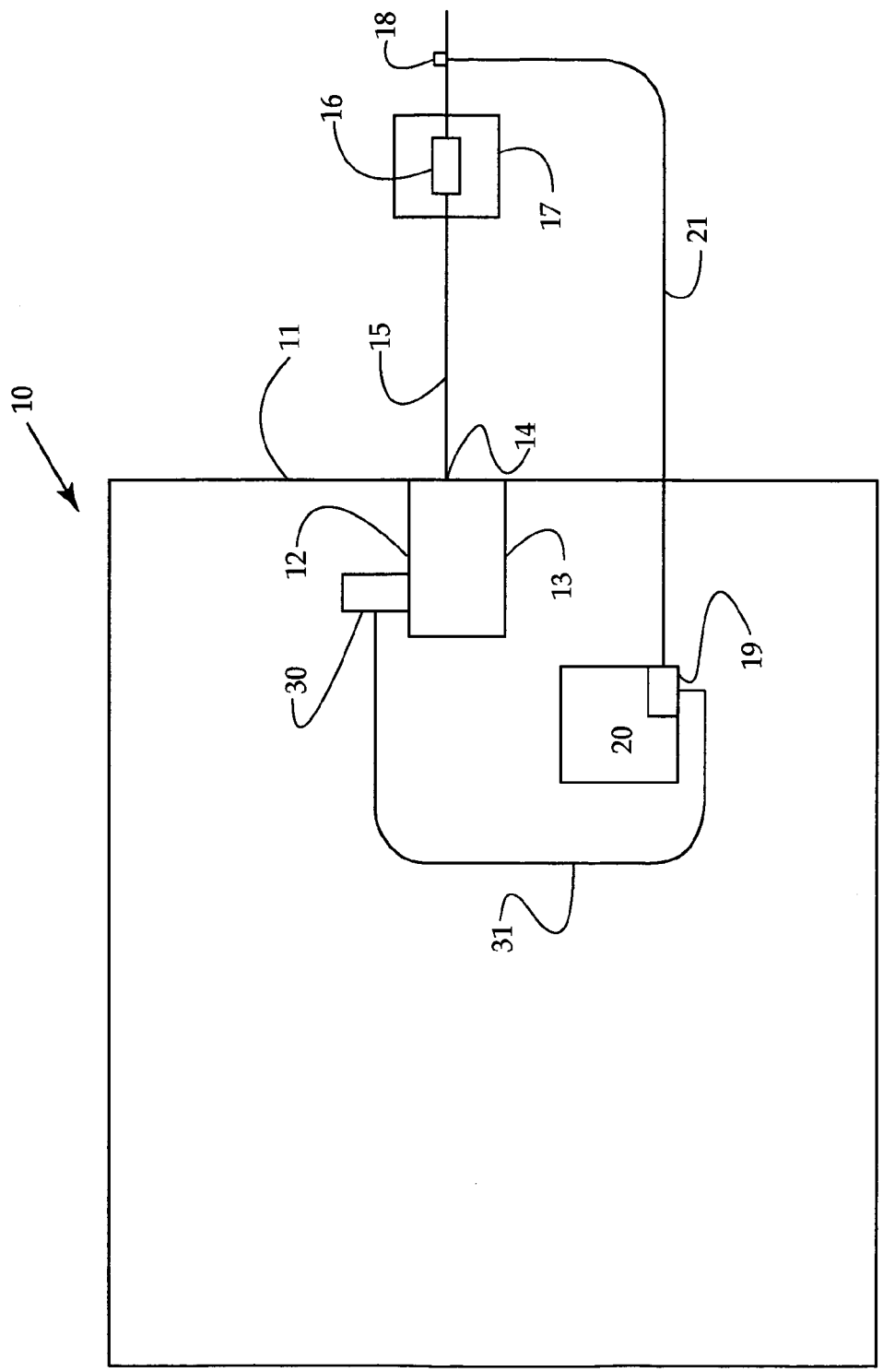
FIG. 1 is a schematic representation of an engine, according to the present disclosure.

Referring to FIG. 1, there is shown a schematic representation of an internal combustion engine 10, according to the present disclosure. The engine 10 includes an engine housing 11 to which at least one fuel injector 30 is attached. The fuel injector 30 is fluidly connected to a combustion chamber 12, in which fuel is mixed with air and combusted. A combustion chamber housing 13 defines an exhaust outlet 14 that is fluidly connected to the atmosphere outside of the engine 10 via an exhaust passage 15. A NOx adsorber catalytic converter 17 including a NOx adsorber 16 is positioned within the exhaust passage 15. Those skilled in the art will appreciate that the NOx adsorber is a catalyst that operates in two phases in order to control undesirable emissions. During a NOx storage phase 35 (illustrated in FIG. 4), NOx within a reductant-lean exhaust produced from normal engine operations is oxidized and stored on the NOx adsorber 16. Generally, the storage phase 35 can last approximately thirty seconds to ten minutes. During a regeneration phase 37 (illustrated in FIG. 4), the stored NOx is removed from the NOx adsorber 16 and converted into harmless gasses via a reductant-rich exhaust. The regeneration phase 37 generally lasts between one to fifteen seconds. Those skilled in the art will appreciate that the amount of reductions in the exhaust is preferably controlled by the amount of fuel being injected into the combustion chamber 12. However, the present invention could also find application with engines in which the amount of reductions in the exhaust is increased by injecting additional fuel into the exhaust passage upstream from the NOx adsorber.

An electronic control module 20 is in communication with the fuel injector 30 via an injector communication line 31 and at least one sensor 18 via a sensor communication line 21. The electronic control module 20 includes an article 19 including a computer readable data storage medium on which means for controlling the two-phase NOx adsorber cycle is recorded. The at least one sensor 18 is positioned downstream from the NOx adsorber 16, and is operable to sense a plurality of times during the regeneration phase 37 at least one of a NOx, ammonia, and nitrous oxideconcentrations in the exhaust. It should be appreciated that the NOx sensor 18 can be positioned at any point within the exhaust passage 15 at which the sensor 18 can sense the concentrations within the exhaust downstream from the NOx adsorber 16. The present disclosure is illustrated as using the monolithic NOx sensor commercially available, the Generation 5 NOx sensor manufactured by NGK Automotive Ceramics U.S.A., Inc. Those skilled in the art will appreciate that the Generation 5 NOx sensor 18 can also sense and provide a separate signal for the oxygen concentration of the downstream exhaust. Moreover, the Generation 5 NOx sensor 18 is not only sensitive to NOx, but also has some sensitivity to ammonia and nitrous oxide. It should be appreciated that, as technology progresses, the present disclosure contemplates use of sensors other than the Generation 5 NOx sensor, such as sensors that sense only ammonia, NOx or nitrous oxide concentrations. Moreover, although it is preferred that the downstream exhaust concentrations of ammonia, NOx and nitrous oxide, all are sensed, the present disclosure can be accomplished with only one of ammonia, NOx and nitrous oxide concentrations being sensed. For instance, if a durable ammonia sensor is developed for diesel exhaust, the ammonia sensor, alone, may provide a fast, robust sensor that could be used in a method for determining the end of the regeneration phase.

Figure 2:
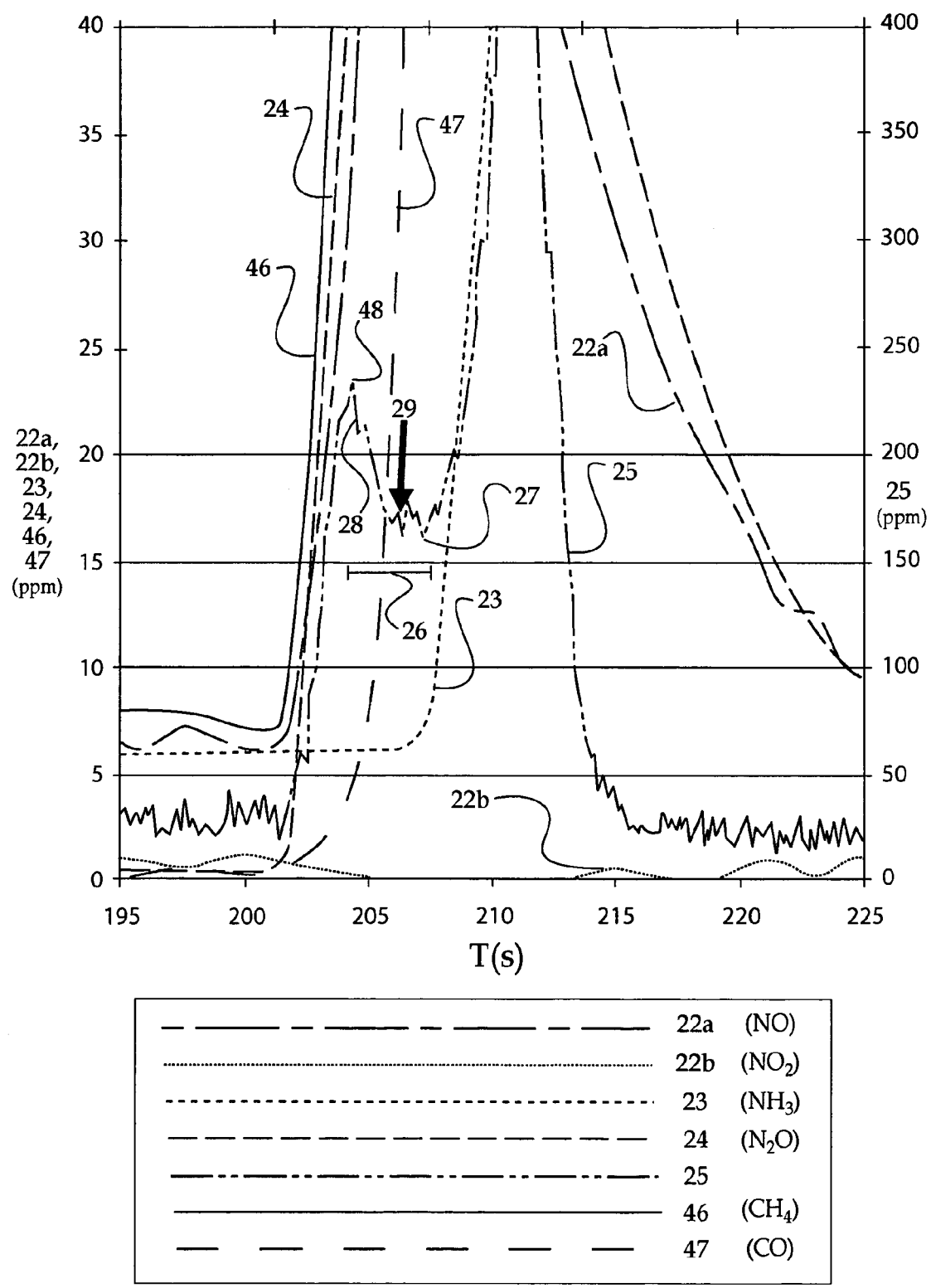
FIG. 2 is a graph illustrating concentrations of a NOx sensor signal and various compounds within downstream exhaust of a NOx adsorber during an example regeneration process.

Referring to FIG. 2, there is shown a graph illustrating concentrations of a NOx sensor signal 25 and various compounds 22a, 22b, 23, 24, 46 and 47 within the downstream exhaust of the NOx adsorber during an example regeneration process. The concentrations of various compounds 22a, 22b, 23, 24, 46 and 47 are measured by a Fourier Transform Infrared (FTIR) analyzer in parts per million along the left y-axis and the NOx sensor signal 25 is measured in parts per million along the right y-axis. Time is measured in seconds along the x-axis, and the graph begins at the 195$^{th}$ second within the NOx adsorber cycle, which in the illustrated example, corresponds with the end of the storage phase 35. However, it should be appreciated that, in the illustrated example, the NOx adsorber cycle did not necessarily begin at 0 seconds, thus, the 195th does not imply that the storage phase lasted 195 seconds. In the illustrated example, the regeneration phase 37 begins at approximately 200–202 seconds and ends at approximately 210–11 seconds. Those skilled in the art should appreciate that the curves representing the concentrations of the various compounds 22, 23, 24, 46 and 47 may be shifted slightly to the right due to the delay in the FTIR analyzer.

The exhaust downstream from the NOx adsorber 16 during the regeneration phase 37 can include concentrations of ammonia ($NH_3$) 23, nitrous oxide ($N_2O$) 24, carbon monoxide 47, methane ($CH_4$) 46, and NOx, which includes nitrogen monoxide (NO) 22a and nitrogen dioxide ($NO_2$) 22b. Because the NOx sensor 18 has a limited sensitivity to nitrous oxide and ammonia, the NOx sensor signal 25 is likely influenced by the nitrous oxide and ammonia concentrations 24 and 23 produced during regeneration, along with the NOx concentrations 22 of the downstream exhaust. For instance, the increase in the NOx signal 25 during regeneration is likely caused, in part, by an increase in the ammonia and nitrous oxide concentrations 23 and 24.

The NOx sensor signal 25 will generally increase over the regeneration phase 37 of the NOx adsorber 16. However, an expected plateau region 26 will separate the NOx sensor signal increase into a first increase and a second increase. Although the expected plateau region 26 can occur at different times within the regeneration phase 37 depending on the engine load and conditions, in the illustrated example, the expected plateau region 26 occurs between approximately 204–208 seconds. The expected plateau region 26 is defined as a decrease in the NOx sensor signal 25 (as shown in FIG. 2) or a leveling off of the NOx sensor signal 25 over time. The "leveling off" of the NOx sensor signal 25 can include a relatively significant decrease in the rate of the NOx sensor signal increase or the NOx sensor signal 25 can become constant over a period of time. Being that the expected plateau region 26 can include a decrease in the NOx sensor signal 25 or a leveling off of the NOx sensor signal 25 over time, those skilled in the art will also appreciate that the expected plateau region 26 includes at least an inflection point region 29, and may also include a local maximum 48, a local minimum 27, and a negative slope 28. The inflection point region 29 is the region in which the curve of the decreasing NOx sensor signal 25 changes from convex to concave, and thus, would be included in all contemplated expected plateau regions, including those without a negative slope. An expected plateau region that includes a negative slope, such as the illustrated expected plateau region 26, begins at the local maximum and ends at the local minimum. An expected plateau region 26 that "levels off", and thus, does not include a negative slope, may begin at a point where the slope of the NOx sensor signal begins to significantly decrease and ends at a point where the slope of the NOx sensor signal begins to significantly increase.

Figure 3:
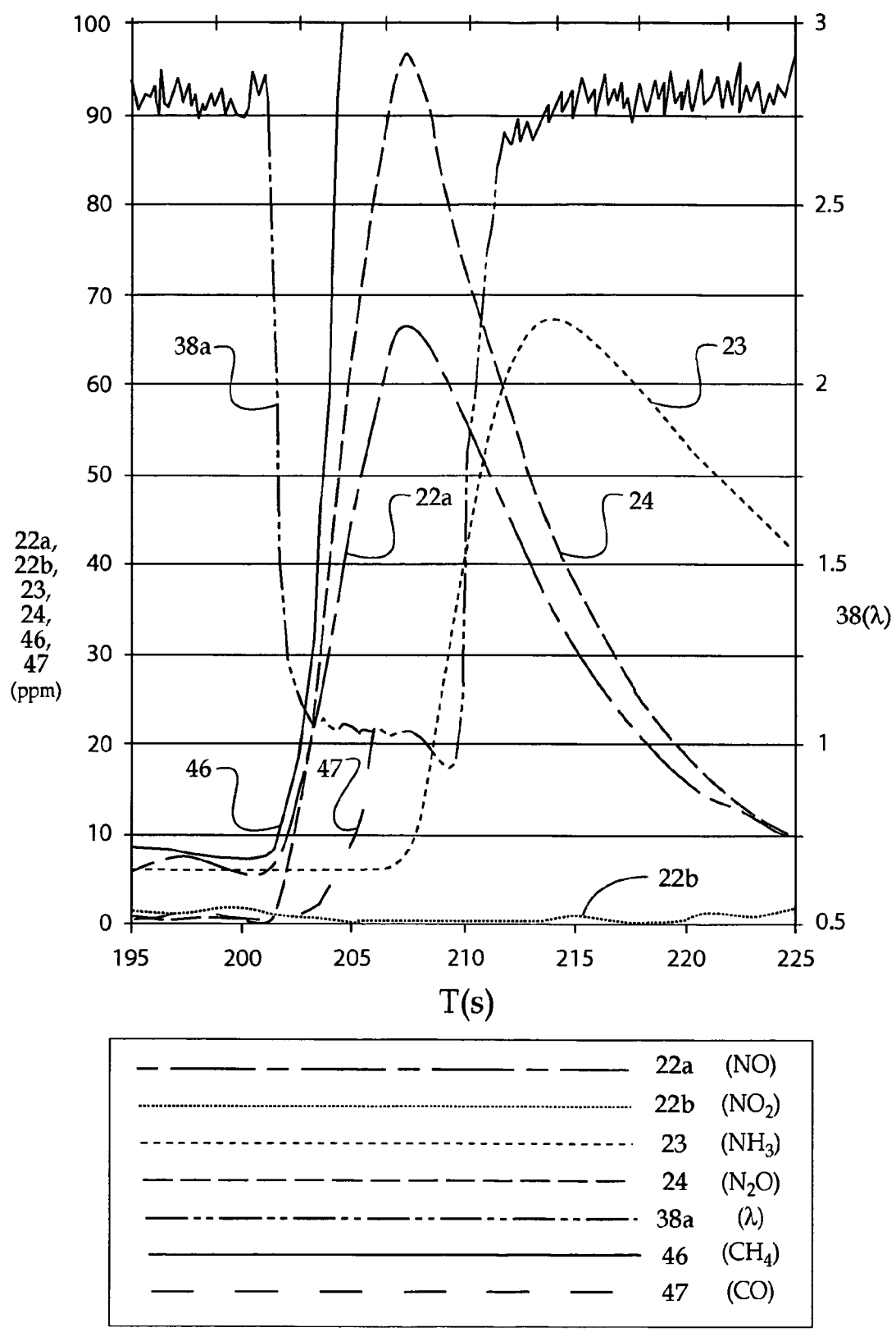
FIG. 3 is a graph illustrating concentrations of oxygen and various compounds within the downstream exhaust of the NOx adsorber during the example regeneration process.

Referring to FIG. 3, there is shown a graph illustrating the concentrations of oxygen 38a and the various other compound 22a, 22b, 23, 24, 46, 47 within the downstream exhaust of the NOx adsorber 16 during the example regeneration process. Time is measured in seconds along the x-axis, and similar to FIG. 2, begins at the 195$^{th}$ second within the NOx adsorber cycle that corresponds to the end of the storage phase 35. The regeneration phase 37 occurs from approximately 200–202 to 210–11 seconds. However, those skilled in the art will appreciate that the concentration of compounds 22a, 22b, 23, 24, 46 and 47 may be shifted slightly to the right due to the delay of the FTIR analyzer. In the illustrated example, the concentrations of various compounds 22a, 22b, 23, 24, 46 and 47 are measured in parts per million on the left y-axis, and oxygen concentration 38a is measured on the right y-axis in lambda ($\lambda$), which is defined as air-to-fuel ratio divided by stoichiometric air-to-fuel ratio. Lambda, or the oxygen concentration 38a, decreases when the regeneration phase 37 begins due to the use of reductant-rich exhaust. During the regeneration phase 37, lambda, or the oxygen concentration 38a, stays relatively constant. When the NOx adsorber 16 is regenerated, the oxygen concentration 38a in the downstream exhaust may decrease below a predetermined oxygen concentration 38b. The predetermined oxygen concentration 38b is measured as lambda of the exhaust upstream from the NOx adsorber 16. Thus, the sensed oxygen concentration 38a will decrease below the predetermined oxygen concentration 38b at lambda breakthrough, which is the point when lambda of the downstream exhaust is less than lambda of the exhaust upstream from the NOx adsorber 16. The lambda upstream can be determined based on the known fuel to air ratio in the combustion chamber 12, and in the illustrated example, has been determined to be one. In the illustrated example, lambda breakthrough occurred at approximately 209–10 seconds.

Figure 4:
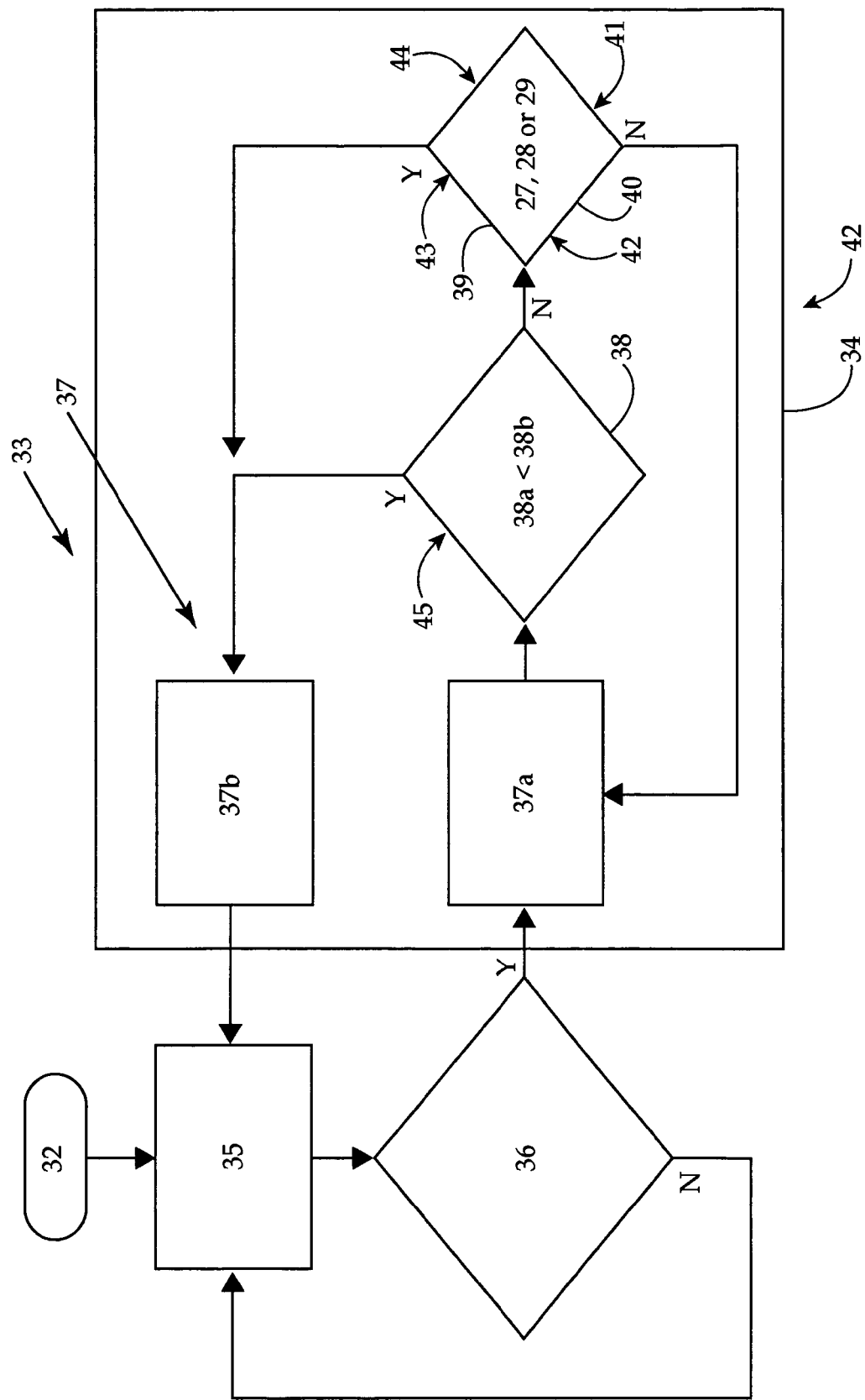
FIG. 4 is a flow chart of a regeneration monitoring algorithm, according to the present disclosure.

Referring to FIG. 4, there is shown a flow chart of a NOx adsorber two-phase cycle 33, according to the present disclosure. The means for controlling the NOx adsorber two-phase cycle 33 are recorded and stored in electronic control module 20. The adsorber two-phase cycle 33 includes the storage phase 35 and the regeneration phase 37. Upon engine start-up 32, the NOx adsorber 16 will be in the storage phase 35 in which reductant-lean exhaust will pass through the NOx adsorber catalytic converter 17. The electronic control module 20 preferably includes a NOx adsorber storage phase completion indicator 36 that is operable to determine when the storage phase 35 is complete. The present disclosure contemplates various storage phase completion indicators, including, but not limited to, a predetermined storage phase duration time and a NOx concentration slip signal. If the NOx adsorber storage phase completion indicator 36 determines that the storage phase 35 is not complete, the engine 10 will continue with normal operations producing reductant-lean exhaust. If the storage phase completion indicator 36 determines that the storage phase 35 is complete, the electronic control module 20 will trigger the regeneration phase start 37a by signaling the fuel injector 30 to inject an increased amount of fuel into the combustion chamber 13, thus creating reductant-rich exhaust.

The electronic control module 20 includes the computer readable data storage medium on which means 42 are recorded for determining when the NOx adsorber 16 is regenerated to a predetermined extent, at least in part, by determining if a time rate of change of at least one of NOx, nitrous oxide and ammonia concentrations 22, 24 and 23 is after an expected plateau region 26 begins during the regeneration phase 37. The means 42 include the regeneration monitoring algorithm 34. The NOx adsorber 16 is regenerated to the extent that the NOx has been sufficiently removed from the NOx adsorber 16 and converted to harmless gasses before a spike in the unregulated emissions 23 and 24 of the downstream exhaust.

As the NOx adsorber 16 operates in the regeneration phase 37, the regeneration monitoring algorithm 34 operates to determine the end of the regeneration phase 37 by monitoring the time rate of change of the NOx, nitrous oxide and ammonia concentrations 22, 24 and 23 and preferably a secondary regeneration indicator 38. The secondary regeneration completion indicator 38 is a means additional to the NOx sensor signal 25 for determining the end of the regeneration phase 37. Thus, the secondary regeneration indicator 38 acts as an added assurance that the reductant-rich exhaust will not be created for an extended time after the regeneration of the NOx adsorber 16. It should be appreciated that the present disclosure contemplates more than one secondary regenerator indicator. Although those skilled in the art will appreciate that there can be various secondary regeneration completion indicators, including, but not limited to, a predetermined duration time of the regeneration phase, the secondary regeneration completion indicator 38 of the preferred embodiment is based on the downstream exhaust oxygen concentration 38a. The electronic control module 20 preferably includes means 45 for determining if the downstream exhaust oxygen concentration 38a is less than the predetermined downstream oxygen concentration 38b. The sensed downstream oxygen concentration 38a is less than the predetermined oxygen concentration 38b when the electronic control module 20 determines that the downstream exhaust lambda is less than upstream exhaust lambda, which in the illustrated example is one. If the downstream exhaust oxygen concentration 38a is less than the predetermined oxygen concentration 38b, the electronic control module 20 will signal the engine 10 to end the regeneration phase 37b and return to normal engine operations producing reductant-lean exhaust for the start of the storage phase 35. If the downstream exhaust oxygen concentration 38a is greater than the predetermined oxygen concentrations 38b, the regeneration monitoring algorithm 34 will determine whether to end the regeneration phase 37 based on the NOx sensor signal 25.

The electronic control module 20 includes a means 43 for storing the NOx sensor signal 25 a plurality of times. The regeneration monitoring algorithm 34 includes a concentration storing algorithm 39 that is operable to store the NOx sensor signal 25 a plurality of times. In the preferred illustrated embodiment, the NOx sensor signal 25 is based on the NOx 22, nitrous oxide 24, and ammonia 23 concentrations. The regeneration monitoring algorithm 34 also includes a concentration monitoring algorithm 40 being operable to determine when the time rate of change of the NOx sensor signal 25 is after the expected plateau region 26 begins. Those skilled in the art will appreciate that there are various methods of determining from the stored NOx sensor signal 25 when the time rate of change of the NOx sensor signal 25 is after the expected plateau region 26 begins. For instance, the NOx sensor signal 25 is after the beginning of the expected plateau region 26 if the NOx sensor signal 25 is later in time than the local maximum 48.

In the preferred embodiment, the electronic control module 20 includes means 42, being the concentration monitoring algorithm 40, for determining if the time rate of change of the NOx sensor signal 25 is after the expected plateau region 26 by determining if the time rate of change of the NOx sensor signal 25 is later in time than the local minimum 27, the negative slope 28 or the inflection point region 29. It should be appreciated that the present disclosure contemplates a concentration monitoring algorithm that determines if the expected plateau region 26 has begun by determining any one or combination of the local minimum 27, the inflection point region 29, and/or negative slope 28. The electronic control module 20 also preferably includes means 41 for filtering the NOx sensor signal 25 so that the local minimum 27, the negative slope 28 and the inflection point region 29 can be detected. Those skilled in the art will appreciate that the electronic filtering will reject noise and accommodate the sensor response time.

If the concentration monitoring algorithm 40 detects that one of the local minimum 27, the negative slope 28 and the inflection point region 29 has passed, the concentration monitoring algorithm 40 will determine that the time rate of change of the NOx sensor signal 25 is after the expected plateau region 26 begins. The regeneration monitoring algorithm 34 will then end the regeneration phase 37 of the NOx adsorber 16. If the concentration monitoring algorithm 40 does not detect one of the local minimum 27, the negative slope 28 or the inflection point region 29, the regeneration phase 37 of the NOx adsorber 16 will continue. The regeneration monitoring algorithm 34 will repeat itself.

INDUSTRIAL APPLICABILITY

Referring to FIGS. 1–4, the NOx adsorber catalytic converter 17 operates in the two-phase cycle 33 in order to reduce the concentration of NOx, a regulated emission, in the exhaust of the internal combustion engine 10. Upon engine start-up 32, the normal operation of the engine 10 will produce reductant-lean exhaust that will pass through the NOx adsorber catalytic converter 17. The NOx within the exhaust will be oxidized and stored on the NOx adsorber 16. When the storage phase completion indicator 38 determines that the NOx adsorber is full of stored NOx and thus the storage phase 35 is complete, the electronic control module 20 will begin the regeneration phase 37 by signaling the engine 10 to produce a reductant-rich exhaust. In order to create a reductant-rich exhaust, the electronic control module 20 will signal the fuel injector 30 to inject a greater amount of fuel into the combustion chamber 13. There are various methods known in the art that can be used to signal the end of the storage phase 35, such as a significant increase in the NOx concentration of the downstream exhaust or the passage of a predetermined time interval.

During the regeneration phase 37, the reductant-rich exhaust that enters the NOx adsorber catalytic converter 17 includes a relatively low oxygen concentration and high carbon monoxide, hydrogen and hydrocarbons concentrations. The reductants within the reductant-rich exhaust regenerates the NOx adsorber 16 by destoring the NOx from the adsorber 16 and reducing the NOx to harmless gasses, including nitrogen. Once the NOx is consumed, excess reductants, such as methane 46 and carbon monoxide 47, may increase in the downstream exhaust. Further, unregulated emissions, such as nitrous oxide 24 and ammonia 23, may be produced due to the excessive reductants and cause the second increase in the NOx sensor signal 25 after completion of regeneration. Thus, by ending the regeneration phase 37 prior to the NOx sensor signal second increase, there will be less reductants to react with the NOx and cause ammonia emissions. As illustrated in FIG. 2, it has been found that the NOx sensor signal 25 enters the expected plateau region 26 prior to the second NOx sensor increase, referred to as the NOx sensor signal spike. Moreover, as illustrated in FIG. 3, scientists have found that when the oxygen concentration 38a, herein illustrated as lambda, decreases below the predetermined oxygen concentration 38b, the regeneration is complete. Thus, during the regeneration phase 37, the regeneration monitoring algorithm 34 monitors the NOx sensor signal 25 and the oxygen concentration 38a in order to determine when to end the regeneration phase 37.

During the regeneration phase 37, the NOx sensor 16 will sense to the downstream exhaust oxygen concentration 38a. If the sensed oxygen concentration 38a is less than the predetermined oxygen concentration 38b, the regeneration monitoring algorithm 34 will end the regeneration phase 34 of the NOx adsorber 16. In the illustrated example, when the downstream exhaust lambda is less than one, the regeneration monitoring algorithm 34 will trigger the regeneration phase end 37b. As illustrated in FIGS. 2 and 3, if lambda is less than one, the time rate of change of the NOx sensor signal 25 is likely after the local minimum 27, negative slope 28 and inflection point region 29 of the expected plateau region 26. The electronic control module 20 will signal the engine 10 to resume normal operations producing reductant-lean exhaust, and the NOx adsorber 16 will again begin storing NOx. However, if the oxygen concentration 38a is above the predetermined oxygen concentration 38b, meaning lambda is greater than one, the concentration monitoring algorithm 40 will determine, based on the NOx sensor signal 25, whether the NOx adsorber 16 is regenerated to the predetermined extent.

In order to determine the end of the regeneration phase 37 based on the NOx sensor signal 25, the NOx, nitrous oxide and ammonia concentrations 22, 23 and 24 are sensed a plurality of times by the NOx sensor 18. Due to the NOx sensor's limited sensitivity to nitrous oxide and ammonia, the NOx sensor signal 25 is based, in part, on the NOx, nitrous oxide and ammonia concentrations 22, 23, 24. The NOx sensor signal 25 will be stored a plurality of time in the electronic control module 20. Preferably, the NOx sensor signal 25 will be filtered in order to reject noise and accommodate sensor response time. Based on the stored NOx sensor signal 25, the regeneration monitoring algorithm 34 will determine if the time rate of change of the NOx sensor signal 25 is later in time than the expected plateau region 26 beings. In order to determine whether the expected plateau region 26 has begun, the concentration monitoring algorithm 34 will determine whether the time rate of change of the NOx sensor signal 25 is after the local minimum 27, negative slope 28 or inflection point region 29. Moreover, the present disclosure contemplates other methods of determining whether the expected plateau region 26 has begun, such as the concentration monitoring algorithm 34 determining whether the time rate of change of the NOx sensor signal 25 is after the local maximum 48. It is known in the art how to calculate the local maximum 48, local minimum 27, negative slope 28 and the inflection point region 29. If the concentration monitoring algorithm 40 determines that none of the local minimum 27, the negative slope 28 and the inflection point region 29 have passed, the NOx adsorber 16 will continue operation in the regeneration phase 37. Further, the regeneration monitoring algorithm 34 will repeat itself by again comparing the sensed oxygen concentration 38a to the predetermined oxygen concentration 38b. If at least one of the local minimum 27, negative slope 28 and inflection point region 29 has passed, the time rate of change of the NOx sensor signal 25 is after the expected plateau region 26 beings. It should be appreciated that by calculating the local maximum 48, local minimum 27, the negative slope 28 and the inflection point region 29 rather than just the inflection point region 29, the concentration monitoring algorithm 40 has a greater likelihood of accurately determining the end of the NOx adsorber regeneration prior to the NOx signal spike.

If the regeneration monitoring algorithm 40 determines that the time rate of change of the NOx sensor signal 25 is after the expected plateau region 26 begins, the electronic control module 20 will trigger the regeneration phase end 37b of the NOx adsorber 16. The two-phase cycle 33 will repeat itself, and the engine 10 will once again produce reductant-lean exhaust, requiring less fuel.

The present disclosure is advantageous because it limits the overall fuel consumption of the engine 10 by providing a more accurate method of determining when to end the regeneration phase 37 of the two phase NOx adsorber cycle 33. Because the regeneration of the NOx adsorber 16 requires reductant-rich exhaust, which in return requires additional fuel, it is desirable to end the regeneration phase 37 as soon as the NOx adsorber 16 is regenerated. Because scientists have found that sufficient completion of the regeneration correlates with the expected plateau region 26 in the NOx sensor signal 25 and/or the decrease in the oxygen concentration 38a below the predetermined oxygen concentration 38b, the duration of the regeneration phase 37 of each cycle 33 can be individualized rather than based on a one size fits all predetermined timed cycle. Thus, excess fuel will not be used to create reductant-rich exhaust after the NOx adsorber 16 is sufficiently regenerated.

The present disclosure is also advantageous because it reduces the concentrations of unregulated, undesirable emissions, including ammonia, in the exhaust. The expected plateau region 26 of the NOx signal sensor 25 generally occurs before lambda breakthrough and corresponds with the increase of the ammonia concentration 23. In the illustrated example, the inflection point region 29 occurs at approximately 205 or 206 seconds, as illustrated in FIG. 2, and lambda breakthrough occurs at approximately 209 or 210 seconds, as illustrated in FIG. 3. Thus, by monitoring the time rate of change of the NOx sensor signal 25, the regeneration monitoring algorithm 34 can end the regeneration phase 37 prior to lambda breakthrough, thereby reducing the reductants within exhaust that may combine with nitrogen containing species to form ammonia.

However, lambda breakthrough, as the secondary completeness indicator 38, assures that the engine 10 stops producing reductant-rich exhaust relatively near the time the NOx adsorber 16 is regenerated. If due to noise interference, engine conditions, or other various reasons, the regeneration monitoring algorithm 34 fails to detect the negative slope 28, the inflection point region 29, and the local minimum 27, the regeneration monitoring algorithm 34 will end the regeneration phase 37 upon the detection of the lambda breakthrough. The present disclosure contemplates, using a predetermined timed interval as a third regeneration completeness indicator. For instance, if the regeneration monitoring algorithm failed to end the regeneration phase based on the time rate of change of the NOx sensor signal and the oxygen concentration, the regeneration phase would end after a predetermined time.

The present disclosure is further advantageous because it utilizes existing components within the engine 10. The NOx sensor 18 is often positioned within the exhaust passage 15 to assure compliance with federal emissions standards. By taking advantage of the NOx sensors' cross sensitivity to ammonia and nitrous oxide, the present disclosure utilizes the existing NOx sensor 18 to more accurately determine the end of the NOx adsorber regeneration 37.

Those skilled in the art should appreciate that the present disclosure may find use in applications other than those illustrated. For instance, the present disclosure may find use in removing NOx from any combustion products, such as those generated in large scale power generation. It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A method of regenerating a NOx adsorber, comprising the steps of:
   regenerating the NOx adsorber;
   sensing, in the downstream exhaust, at least one of NOx, nitrous oxide, and ammonia concentrations a plurality of times during the regeneration;
   determining if a time rate of change of the at least one of NOx, nitrous oxide, and ammonia concentrations is after an expected plateau region begins; and
   ending the regeneration of the NOx adsorber if the time rate of change of the at least one of NOx, nitrous oxide, and ammonia concentrations is after the expected plateau region begins.

2. The method of claim 1 wherein the step of determining includes a step of storing the at least one of sensed NOx, nitrous oxide, and ammonia concentrations a plurality of times.

3. The method of claim 2 wherein the step of determining includes a step of determining when the time rate of change of the at least one of NOx, nitrous, and ammonia concentrations is later in time than at least one of a local minimum and a negative slope.

4. The method of claim 2 wherein the step of determining includes a step of determining when the time rate of change of the at least one of NOx, nitrous oxide, and ammonia concentrations is later in time than an inflection point of the expected plateau region.

5. The method of claim 1 wherein the step of ending includes a step of determining at least one secondary regeneration completeness indicator.

6. The method of claim 5 wherein the step of determining includes a step of determining when an oxygen concentration of the downstream exhaust decreases below a predetermined oxygen concentration.

7. The method of claim 6 wherein the step of determining includes a step of storing the at least one of sensed NOx, nitrous oxide and ammonia concentrations a plurality of times, and a step of determining when the time rate of change of the at least one of NOx, nitrous oxide, and ammonia concentration is later in time than at least one of a negative slope, a local minimum and an inflection point of the expected plateau region.

8. An engine comprising:
   a NOx adsorber positioned within the exhaust passage;
   at least one sensor being positioned downstream from the NOx adsorber and being operable to sense, in the downstream exhaust, at least one of NOx, nitrous oxide and ammonia concentrations a plurality of times during a regeneration phase of the NOx adsorber; and
   an electronic control module being in communication with the at least one sensor, and including a regeneration monitoring algorithm being operable to end the regeneration phase when a time rate of change of the at least one of NOx, nitrous oxide and ammonia concentrations is after an expected plateau region begins.

9. The engine of claim 8 wherein the regeneration monitoring algorithm includes a concentration storing algorithm being operable to store the at least one of sensed NOx, nitrous oxide and ammonia concentrations a plurality of times.

10. The engine of claim 9 wherein the regeneration monitoring algorithm includes a concentration monitoring algorithm being operable to determine if the time rate of change of the at least one of NOx, nitrous oxide, and ammonia concentrations is after the expected plateau region begins, at least in part, by determining if the time rate of change of the at least one of NOx, nitrous oxide, and ammonia concentrations is later in time than at least one of a local minimum and a negative slope.

11. The engine of claim 9 wherein the regeneration monitoring algorithm includes a concentration monitoring algorithm being operable to determine if the time rate of change of the at least one of NOx, nitrous oxide and ammonia concentrations is after the expected plateau region begins, at least in part, by determining if the time rate of change of the at least one of NOx, nitrous oxide and ammonia concentrations is later in time than an inflection point of the expected plateau region.

12. The engine of claim 8 wherein the regeneration monitoring algorithm includes at least one secondary regeneration completion indicator.

13. The engine of claim 12 wherein the at least one secondary regeneration completion indicator being an oxygen concentration of the downstream exhaust.

14. The engine of claim 13 wherein the regeneration monitoring algorithm includes a concentration storing algorithm being operable to store the at least one of sensed NOx, nitrous oxide and ammonia concentrations a plurality of times, and a concentration monitoring algorithm being operable to determine if the time rate of change of the at least one of NOx, nitrous oxide and ammonia concentrations is after the expected plateau region begins, at least in part, by determining if the time rate of change of the at least one of the NOx, nitrous oxide, and ammonia concentrations is later in time than at least one of a local minimum, a negative slope, and an inflection point of the expected plateau region.

15. An article comprising:
a computer readable data storage medium; and
means recorded on the medium for determining when a NOx adsorber is regenerated to a predetermined extent, at least in part, by determining if a time rate of change, during regeneration, of at least one of NOx, nitrous oxide and ammonia concentrations is after a beginning of an expected plateau region.

16. The article of claim 15 wherein the computer readable data storage medium being included within an electronic control module.

17. The article of claim 15 wherein the means recorded includes means for storing the at least one of NOx, nitrous oxide and ammonia concentrations a plurality of times.

18. The article of claim 17 wherein the means recorded include means for determining if the time rate of change of the at least one of NOx, nitrous oxide and ammonia concentrations is later in time than at least one of a local minimum, a negative slope, and an inflection point of the expected plateau region.

19. The article of claim 18 wherein the means for determining includes means for filtering the at least one of stored NOx, nitrous oxide and ammonia concentration data.

20. The article of claim 17 wherein the means recorded on the medium include means for determining if a downstream exhaust oxygen concentration being less than a predetermined downstream oxygen concentration.

* * * * *

UNITED STATES PATENT AND TRADEMARK OFFICE
CERTIFICATE OF CORRECTION

| | | |
|---|---|---|
| PATENT NO. | : 7,168,243 B2 | Page 1 of 1 |
| APPLICATION NO. | : 11/074402 | |
| DATED | : January 30, 2007 | |
| INVENTOR(S) | : Dennis L. Endicott et al. | |

It is certified that error appears in the above-identified patent and that said Letters Patent is hereby corrected as shown below:

Column 1, line 3, insert:

[0001] The United States Government has certain rights in the present application, and any patent that may issue thereon, under DOE Contract No. De-FC05-00OR22806.

Signed and Sealed this

Twenty-fourth Day of April, 2007

JON W. DUDAS
*Director of the United States Patent and Trademark Office*